(12) United States Patent
Cremer et al.

(10) Patent No.: US 8,118,882 B2
(45) Date of Patent: Feb. 21, 2012

(54) POLYMERIC HAIR DYES

(75) Inventors: Christian Cremer, Lörrach (DE); Sophie Marquais-Bienewald, Hegenheim (FR); Olof Wallquist, Bottmingen (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/812,782

(22) PCT Filed: Jan. 7, 2009

(86) PCT No.: PCT/EP2009/050088
§ 371 (c)(1),
(2), (4) Date: Dec. 1, 2010

(87) PCT Pub. No.: WO2009/090122
PCT Pub. Date: Jul. 23, 2009

(65) Prior Publication Data
US 2011/0061180 A1    Mar. 17, 2011

(30) Foreign Application Priority Data
Jan. 17, 2008   (EP) .................................... 08150356
Jan. 29, 2008   (EP) .................................... 08150773

(51) Int. Cl.
*A61Q 5/10*       (2006.01)
*C07D 213/09*     (2006.01)
(52) U.S. Cl. .......... 8/405; 8/552; 8/554; 8/647; 546/253
(58) Field of Classification Search ............. 8/405, 552, 8/554, 647; 546/253
See application file for complete search history.

(56) References Cited

U.S. PATENT DOCUMENTS

| | | | |
|---|---|---|---|
| 4,182,612 A | 1/1980 | Sokol | |
| 4,228,259 A | 10/1980 | Kalopissis | |
| 6,306,182 B1 | 10/2001 | Chan et al. | |
| 7,731,761 B2 | 6/2010 | Marquais-Bienewald | |

FOREIGN PATENT DOCUMENTS

| | | |
|---|---|---|
| FR | 2456764 A2 | 12/1980 |
| WO | 2006/134051 A | 12/2006 |
| WO | 2008/009579 A | 1/2008 |
| WO | WO 2008/009579 A1 * | 1/2008 |
| WO | 2009/090121 A | 7/2009 |
| WO | 2009/090125 A | 7/2009 |

OTHER PUBLICATIONS

STIC Search Report dated Mar. 18, 2011.*
Journal of American Chemical Society, vol. 98, No. 19, 1976 pp. 5996-6000.
Copending U.S. Appl. No. 12/812,785, filed Jul. 14, 2010.
Copending U.S. Appl. No. 12/812,781, filed Jul. 14, 2010.
Copending U.S. Appl. No. 12/812,778, filed Jul. 14, 2010.
Brief Translation of FR 2456764 Printed on Oct. 11, 2010.

* cited by examiner

*Primary Examiner* — Eisa Elhilo
(74) *Attorney, Agent, or Firm* — Shiela A. Loggins

(57) ABSTRACT

Disclosed are cationic oligomeric dye, comprising a low molecular weight polyamine comprising the repeating units (1a) or (1b), wherein at least 90% of the polyamine molecules are selected from tetramines, pentamines and hexamines; and R is the residue of a cationic dye, which is covalently bonded, optionally via a linker, to the nitrogen atoms of the polyamine; or hydrogen; wherein the polyamine repeating units (1a) and (1b) comprise at least one carionic dye residue; and n is a number from 3-12. The dyes are distinguished by their depth of shade and their good fastness properties to washing, such as, for example, fastness to light, shampooing and rubbing.

18 Claims, No Drawings

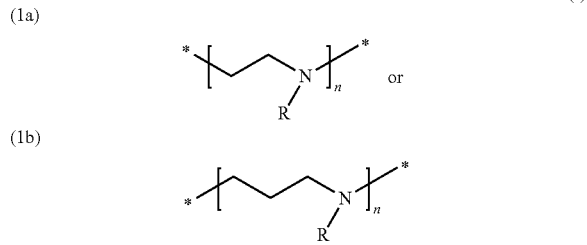

POLYMERIC HAIR DYES

The present invention relates to novel polymeric dyes and compositions comprising these compounds, to a process for their preparation and to their use for dyeing of organic materials, such as keratin-containing fibers, wool, leather, silk, cellulose or polyamides.

It is well known that cationic compounds have a good affinity to negative charged hair. These characteristics have been used to contact the hair with small molecules, but also with polymers.

Numerous cationic polymeric dyes have been disclosed for use as a colorant for human hair, for example in U.S. Pat. No. 4,228,259, U.S. Pat. No. 4,182,612 or FR 2 456 764. These references teach that the polymer moiety has the cationic charge.

Surprisingly it was found that very good dyeing results are obtained with polymeric hair dyes wherein the cationic charge is located in dye moiety.

Therefore the present invention relates to cationic oligomeric dye, comprising a low molecular weight polyamine comprising the repeating units

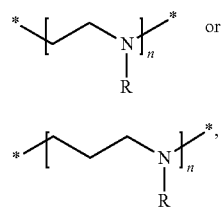

(1a)

or (1b)

wherein at least 90% of the polyamine molecules are selected from tetramines, pentamines and hexamines; and R is the residue of a cationic dye, which is covalently bonded, optionally via a linker, to the nitrogen atoms of the polyamine; or hydrogen; wherein the polyamine repeating units (1a) and (1b) comprise at least one carionic dye residue; and n is a number from 3-12.

Preferably in formulas (1a) and (1b)

R is hydrogen; or a radical of formula $*-X_1-(Y_1^{a+})$, wherein $X_1$ is a linkage group selected from $C_1$-$C_{30}$alkylene, $C_2$-$C_{12}$alkenylene, $C_5$-$C_{10}$arylene, $C_5$-$C_{10}$cycloalkylene or $C_1$-$C_{10}$alkylene($C_5$-$C_{10}$arylene) which may be interrupted and/or terminated at one or both ends by one or more than one —O—, —S—, —N=, —N($R_1$)—, S(O)—, —SO$_2$—, —(CH$_2$CH$_2$—O)$_{1-5}$—, —(CH$_2$CH$_2$CH$_2$—O)$_{1-5}$—, —C(O)—, —C(O)O—, —OC(O)—,

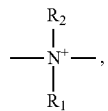

—CON($R_1$)—, —C(N$R_1R_2$)$_2$—, —($R_1$)NC(O)—, —C(S)$R_1$— or an optionally substituted, saturated or unsaturated, fused or non-fused aromatic or nonaromatic (hetero)cyclic bivalent radical optionally comprising at least one heteroatom; —O—; —S—; —N($R_1$)—; —S(O)—; —SO$_2$—; —(CH$_2$CH$_2$—O)$_{1-5}$—; —C(O)—; —C(O)O—, —OC(O)—;

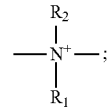

—C(O)N($R_1$)—; S(O)$_2$N($R_1$)—; —C(N$R_1R_2$)$_2$—; —($R_1$)NC(O)—; —C(S)$R_1$—; saturated or unsaturated, fused or non-fused aromatic or nonaromatic bivalent radical optionally comprising at least one heteroatom, which is optionally substituted by $C_1$-$C_{30}$alkyl, $C_1$-$C_{30}$alkoxy, $C_2$-$C_{12}$alkenyl, $C_5$-$C_{10}$aryl, $C_5$-$C_{10}$cycloalkyl, $C_1$-$C_{10}$alkyl($C_5$-$C_{10}$arylene), halogen, hydroxy, E or E'; or the direct bond;

$R_1$ and $R_2$ independently from each other hydrogen; unsubstituted or substituted, straight-chain or branched, monocyclic or polycyclic, interrupted or uninterrupted $C_1$-$C_{14}$alkyl; $C_1$-$C_{14}$hydroxyalkyl; $C_1$-$C_{14}$-aminoalkyl; $C_2$-$C_{12}$alkenyl; $C_6$-$C_{10}$aryl; $C_6$-$C_{10}$aryl-$C_1$-$C_{10}$alkyl; or $C_5$-$C_{10}$alkyl($C_5$-$C_{10}$aryl);

$Y_1$ is hydrogen; halogen; $C_1$-$C_6$alkyl; $C_1$-$C_6$-alkoxy; $C_1$-$C_6$alkylamino; $C_6$-$C_{10}$aryloxy; $C_6$-$C_{10}$arylamino; SO$_2R_1$; or a residue of an organic dye; wherein at least one of $Y_1$ and $Y_2$ is defined as a residue of an organic dye; and a is a number from 1 to 3.

Preferred are oligomeric dyes, which correspond to the formula

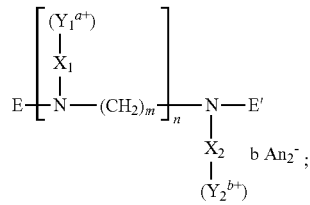

(2)

wherein $X_1$ and $X_2$, independently from each other are a linkage group selected from $C_1$-$C_{30}$alkylene, $C_2$-$C_{12}$alkenylene, $C_5$-$C_{10}$arylene, $C_5$-$C_{10}$cycloalkylene or $C_1$-$C_{10}$alkylene($C_5$-$C_{10}$arylene) which may be interrupted and/or terminated at one or both ends by one or more than one —O—, —S—, —N=, —N($R_1$)—, S(O)—, —SO$_2$—, —(CH$_2$CH$_2$—O)$_{1-5}$—, —(CH$_2$CH$_2$CH$_2$—O)$_{1-5}$—, —C(O)—, —C(O)O—, —OC(O)—,

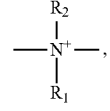

—CON($R_1$)—, —C(N$R_1R_2$)$_2$—, —($R_1$)NC(O)—, —C(S)$R_1$— or an optionally substituted, saturated or unsaturated, fused or non-fused aromatic or non-aromatic (hetero)cyclic bivalent radical optionally comprising at least one heteroatom; —O—; —S—; —N($R_1$)—; —S(O)—; SO$_2$—;

—(CH$_2$CH$_2$—O)$_{1-5}$—; —C(O)—; —C(O)O—, —OC(O)—;

$$-\overset{\underset{|}{R_2}}{\underset{|}{N^+}}-;$$
$$\phantom{-N^+-;}R_1$$

—C(O)N(R$_1$)—; S(O)$_2$N(R$_1$)—; —C(NR$_1$R$_2$)$_2$—; —(R$_1$)NC(O)—; —C(S)R$_1$—; saturated or unsaturated, fused or non-fused aromatic or nonaromatic bivalent radical optionally comprising at least one heteroatom, which is optionally substituted by C$_1$-C$_{30}$alkyl, C$_1$-C$_{30}$alkoxy, C$_2$-C$_{12}$alkenyl, C$_5$-C$_{10}$aryl, C$_5$-C$_{10}$cycloalkyl, C$_1$-C$_{10}$alkyl(C$_5$-C$_{10}$arylene), halogen, hydroxy, E or E'; or the direct bond;

R$_1$ and R$_2$ independently from each other hydrogen; or unsubstituted or substituted, straight-chain or branched, monocyclic or polycyclic, interrupted or uninterrupted C$_1$-C$_{14}$alkyl; C$_1$-C$_{14}$ hydroxyalkyl; C$_1$-C$_{14}$ aminoalkyl; C$_2$-C$_{12}$alkenyl; C$_6$-C$_{10}$aryl; C$_6$-C$_{10}$aryl-C$_1$-C$_{10}$alkyl; or C$_5$-C$_{10}$alkyl(C$_5$-C$_{10}$aryl);

Y$_1$ and Y$_2$ independently from each other are hydrogen; halogen; C$_1$-C$_6$alkyl; C$_1$-C$_6$-alkoxy; C$_1$-C$_6$alkylamino; C$_6$-C$_{10}$aryloxy; C$_6$-C$_{10}$arylamino; SO$_2$R$_1$; or a residue of an organic dye; wherein at least one of Y$_1$ and Y$_2$ is defined as a residue of an organic dye;

An$_1$ and An$_2$ independently from each other are an anion;

E and E' are hydrogen, X$_1$Y$_1^{a+}$, X$_2$Y$_2^{b+}$ or a nitrogen containing heterocyclic radical;

a and b independently from each other are a number from 1 to 3;

m is a number of 2 or 3; and n is a number from 3 to 6.

C$_1$-C$_{14}$alkyl is for example, methyl, ethyl, propyl, isopropyl, n-butyl, sec-butyl, tert-butyl, n-pentyl, 2-pentyl, 3-pentyl, 2,2'-dimethylpropyl, cyclopentyl, cyclohexyl, n-hexyl, n-octyl, 1,1',3,3'-tetramethylbutyl or 2-ethylhexyl, nonyl, decyl, undecyl, dodecyl, tridecyl or tetradecyl.

C$_2$-C$_{14}$alkenyl is for example allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-dodec-2-enyl or n-octadec-4-enyl.

C$_6$-C$_{10}$aryl is for example phenyl or naphthyl.

C$_1$-C$_{30}$alkylene is for example methylene, ethylene, propylene, isopropylene, n-tetramethylene, sec-tetramethylene, tert-tetramethylene, n-pentamethylene, 2-pentamethylene 3-pentamethylene, 2,2'-dimethylpropylene, cyclopentamethylene, cyclohexamethylene, n-hexamethylene, n-octamethylene, 1,1',3,3'-tetramethyltetramethylene, 2-ethylhexamethylene, nonamethylene, decamethylene, tridecamethylene, tetradecamethylene, pentadecamethylene, hexadecamethylene, heptadecamethylene, octadecamethylene, nonadecamethylene or eicosamethylene.

In formulae (2) preferably

Y$_1$ and Y$_2$ independently from each other are halogen; hydrogen; C$_1$-C$_4$alkyl; or a radical selected from the group of anthraquinone, acridine, azo, azamethine, hydrazomethine, triphenylmethane, benzodifuranone, lactones, coumarine, diketopyrrolopyrrol, dioxazine, diphenylmethane, formazane, indigoid indophenol, naphthalimide, naphthoquinone, nitroaryl, merocyanine, methine oxazine, perinone, perylene, pyrenequinone, phtalocyanine, phenazine, quinoneimine, quinacridone, quinophtalone, styryl, stilbene, xanthene, thiazine and thioxanthene dyes.

More preferably, Y$_1$ and Y$_2$ independently from each other are selected from azo, azomethine, hydrazomethine, anthraquinone, merocyanine, methine and styryl dyes.

Most preferably Y$_1$ and Y$_2$ are selected from the radical of formula (Y1)

wherein

Hal is a halogen anion.

Most preferably Y$_1$ and Y$_2$ have the same meaning.

Preferably in formula (2)

E and E' are hydrogen; X$_1$Y$_1^{a+}$; X$_2$Y$_2^{b+}$; or a radical of the formula (2a)

n is a number from 3 to 6;

X$_1$ and X$_2$, independently from each other are a bivalent radical of formula (2b) -(T)$_t$(Z)$_z$—, wherein T is a radical selected from saturated or unsaturated, linear or branched —C$_1$-C$_{12}$alkylene, —C(O)—, —(CH$_2$CH$_2$—O)$_{1-5}$—, —(CH$_2$CH$_2$CH$_2$—O)$_{1-5}$—, —C(O)O—, —OC(O)—, —N(R$_1$)—, —CON(R$_1$)—, —(R$_1$)NC(O)—, —O—, —S—, —S(O)—, —S(O)$_2$—, —S(O)$_2$—N(R$_1$)—, and —N$^+$(R$_1$)(R$_2$)—, which may be interrupted and/or terminated at one or both ends by one or more than one —O—, —S—, —(SO$_2$)—, —N(R$_5$)—, —C(O)—, $$-\overset{\underset{|}{R_6}}{\underset{|}{N^+}}-,$$
$$\phantom{-N^+-,}R_5$$

—CON(R$_5$)—, —(R$_5$)NC(O)— and which is optionally substituted by C$_1$-C$_6$alkyl, C$_1$-C$_6$alkoxy, C$_6$-C$_{12}$aryl, halogen, hydroxy or Y$^+$; or is a direct bond;

Z is —(CH$_2$)$_2$SO$_2$—; —CH$_2$CHR$_1$CO—NR$_2$—; or a biradical of formula (1b)

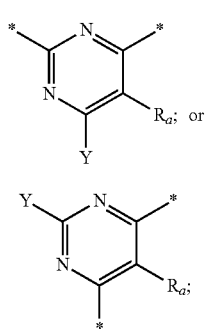

$R_1$ and $R_2$ independently from each other are hydrogen; $C_1$-$C_6$alkyl; $C_1$-$C_6$-alkoxy; $C_1$-$C_6$-alkylamino; $C_6$-$C_{10}$aryloxy; or $C_6$-$C_{10}$arylamino;

$R_a$ is hydrogen; $C_1$-$C_6$alkyl; $C_1$-$C_6$-alkoxy; $C_1$-$C_6$-alkylamino; $C_6$-$C_{10}$-aryloxy; $C_6$-$C_{10}$-aryl-amino; $SO_2R_1$; chlorine; or fluorine;

Y is $R_a$; E; or E';

a and b independently from each other are 1, 2 or 3; and t and z, independently from each other are 0; or 1.

More preferably

T is —$C_2$-$C_3$alkylene-; —C(O)—; —C(O)—$CH_2$—; or —(SO)$_2$—$C_{2-6}$alkylene-;

Z is a biradical of formula

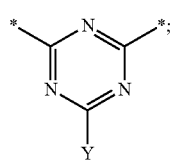

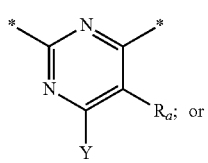

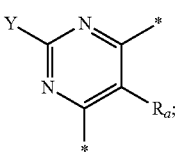

Y is $R_a$; E; or E';

$R_1$ and $R_2$ independently from each other are hydrogen; $C_1$-$C_3$alkyl; $C_1$-$C_4$-alkoxy; $C_1$-$C_4$-alkylamino; $C_6$aryloxy; or $C_6$arylamino;

$R_a$ is chlorine, fluorine, methyl or $SO_2CH_3$; and

E and E' are hydrogen, $X_1Y_1^{a+}$, $X_2Y_2^{b+}$ or a radical of the formula

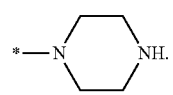

Most preferably t and z are 0.

"Anion" denotes, for example, an organic or inorganic anion, such as halide, preferably chloride and fluoride, sulfate, hydrogen sulfate, phosphate, boron tetrafluoride, carbonate, bicarbonate, oxalate or $C_1$-$C_8$alkyl sulfate, especially methyl sulfate or ethyl sulfate; anion also denotes lactate, formate, acetate, propionate or a complex anion, such as the zinc chloride double salt.

The oligomeric dyes according to the invention are suitable for dyeing organic materials, such as keratin-containing fibers, wool, leather, silk, cellulose or polyamides, cotton or nylon, and preferably human hair including body hairs like eyebrows, eyelashes, pubic-, breast-, armpit- and beard hair. Also animal hair can be colored with the inventive hair dyes.

The dyeings obtained are distinguished by their depth of shade and their good fastness properties to washing, such as, for example, fastness to light, shampooing and rubbing.

Generally, hair dyeing agents on a synthetic base may be classified into three groups:
temporary dyeing agents
semipermanent dyeing agents, and
permanent dyeing agents.

The multiplicity of shades of the dyes can be increased by combination with other dyes.

Therefore the oligomeric dyes according to the present invention may be combined with dyes of the same or other classes of dyes, especially with direct dyes, oxidation dyes; dye pre-cursor combinations of a coupler compound as well as a diazotized compound, or a capped diazotized compound; and/or cationic reactive dyes.

Examples of direct dyes are described in "Dermatology", edited by Ch. Culnan, H. Maibach, Verlag Marcel Dekker Inc., New York, Basle, 1986, Vol. 7, Ch. Zviak, The Science of Hair Care, chapter 7, p. 248-250, and in "Europäisches Inventar der Kosmetikrohstoffe", 1996, published by The European Commission, obtainable in diskette form from the Bundesver-band der deutschen Industrie-und Handelsunternehmen für Arzneimittel, Reformwaren und Körperpflegemittel e.V., Mannheim.

The oligomeric dyes according to the present invention may be used in combination with at least one single direct dye different from the oligomeric dyes according to the present invention The oligomeric dyes according to the present invention do not require any addition of an oxidizing agent to develop their dyeing effect. This fact could possibly reduce the damage of the hair. In addition many of the perceived or documented disadvantages of current oxidative hair dyes like their skin irritation, skin sensitization and allergenic properties can be prevented by the use of the inventive hair dyes. Also, the inventive hair dyes are easier to apply and to use in formulations than oxidative hair dyes since no chemical reaction occurs upon application on the head. Especially advantageous is the fact, that the dyeing time is significantly shorter (ca. 5-10 min) than dyeing using oxidative dyes.

Examples of direct dyes are described in "Dermatology", edited by Ch. Culnan, H. Maibach, Verlag Marcel Dekker Inc., New York, Basle, 1986, Vol. 7, Ch. Zviak, The Science of Hair Care, chapter 7, p. 248-250, and in "Europäisches Inventar der Kosmetikrohstoffe", 1996, published by The European Commission, obtainable in diskette form from the Bundesver-band der deutschen Industrie-und Handelsunternehmen für Arzneimittel, Reformwaren und Körperpflegemittel e.V., Mannheim.

Furthermore, the oligomeric dyes according to the present invention may be combined with at least one cationic azo dye, for example the compounds disclosed in GB-A-2 319 776 as well as the oxazine dyes described in DE-A-299 12 327 and mixtures thereof with the other direct dyes mentioned therein.

The oligomeric dyes according to the present invention may also be combined with acid dyes, for example the dyes which are known from the international names (Color index), or trade names.

The oligomeric dyes according to the present invention may also be combined with uncharged dyes.

Furthermore, oligomeric dyes according to the present invention may also be used in combination with oxidation dye systems.

Furthermore, autooxidizable compounds may be used in combination with the oligomeric dyes according to the present invention.

The oligomeric dyes according to the present invention may also be used in combination with naturally occurring dyes.

Furthermore, oligomeric dyes according to the present invention may also be used in combination with capped diazotized compounds.

Suitable diazotized compounds are for example the compounds of formulae (1)-(4) in WO 2004/019897 (bridging gages 1 and 2) and the corresponding water-soluble coupling components (I)-(IV) as disclosed in the same reference on p. 3 to 5.

Furthermore, the dyes of the present invention can also be combined
- with dyes which are prepared by the reaction of a reactive carbonyl-compound and a CH-acidic compound as described in DE 10 2006 062 435 A1, WO 00038638, DE 10241076 and WO 05120445,
- with thiadiazol dyes as described in DE 10 2006 036898 and DE 10 2005 055496,
- with fluorescent stilbenic sulphur dyes as described in for example WO 07110532 and WO07110542,
- with tetraazapentamethine dyes as described in WO 07071684 and WO 07071686,
- with dimeric cationic dyes as described in FR 2879195, FR 2879127, FR 2879190, FR 2879196, FR 2879197, FR 2879198, FR 2879199, FR 2879200, FR 2879928, FR 2879929 and WO 06063869,
- with azo and styryl dyes as described in EP 0850636,
- with polymeric anionic dyes as described in FR 2882929,
- with disulfide dyes as described in WO 0597051, EP 1647580, WO 06136617,
- with thiol dyes as described in WO 07025889, WO 07039527,
- with conductive polymers as described in US 20050050650 and U.S. Pat. No. 7,217,295

The present invention also relates to formulations, which are used for the dyeing of organic materials, preferably keratin-containing fibers, and most preferably human hair, comprising at least one oligomeric dye according to the present invention.

Preferably the oligomeric dyes according to the present invention are incorporated into the composition for treating organic material, preferably for dyeing in amounts of 0.001-5% by weight (hereinafter indicated merely by "%"), particularly 0.005-4%, more particularly 0.1-3%, based on the total weight of the composition.

The formulations may be applied on the keratin-containing fiber, preferably the human hair in different technical forms.

Technical forms of formulations are for example a solution, especially a thickened aqueous or aqueous alcoholic solution, a cream, foam, shampoo, powder, gel, or emulsion.

Customary the dyeing compositions are applied to the keratin-containing fiber in an amount of 50 to 100 g.

Preferred forms of formulations are ready-to-use compositions or multi-compartment dyeing devices or 'kits' or any of the multi-compartment packaging systems with compartments as described for example in U.S. Pat. No. 6,190,421, col 2, I. 16 to 31.

The pH value of the ready-to-use dyeing compositions is usually from 2 to 11, preferably from 5 to 10.

The dyeing compositions of the present invention are applied on the hair in a temperature range of 10 to 200, preferably 18 to 80, and most preferably from 20 to 40° C.

One preferred embodiment of the present invention relates to the formulation of dyes, wherein the oligomeric dyes according to the present invention are in powder form.

Suitable cosmetic hair-care formulations are hair-treatment preparations, e.g. hair-washing preparations in the form of shampoos and conditioners, hair-care preparations, e.g. pre-treatment preparations or leave-on products such as sprays, creams, gels, lotions, mousses and oils, hair tonics, styling creams, styling gels, pomades, hair rinses, treatment packs, intensive hair treatments, hair-structuring preparations, e.g. hair-waving preparations for permanent waves (hot wave, mild wave, cold wave), hair-straightening preparations, liquid hair-setting preparations, hair foams, hairsprays, bleaching preparations, e.g. hydrogen peroxide solutions, lightening shampoos, bleaching creams, bleaching powders, bleaching pastes or oils, temporary, semi-permanent or permanent hair colorants, preparations containing self-oxidizing dyes, or natural hair colorants, such as henna or camomile.

For use on human hair, the dyeing compositions of the present invention can usually be incorporated into an aqueous cosmetic carrier. Suitable aqueous cosmetic carriers include, for example W/O, O/W, O/W/O, W/O/W or PIT emulsions and all kinds of microemulsions, creams, sprays, emulsions, gels, powders and also surfactant-containing foaming solutions, e.g. shampoos or other preparations, that are suitable for use on keratin-containing fibers. Such forms of use are described in detail in Research Disclosure 42448 (August 1999). If necessary, it is also possible to incorporate the dyeing compositions into anhydrous carriers, as described, for example, in U.S. Pat. No. 3,369,970, especially col 1, I. 70 to col 3, I. 55. The dyeing compositions according to the invention are also excellently suitable for the dyeing method described in DE-A-3 829 870 using a dyeing comb or a dyeing brush.

The constituents of the aqueous carrier are present in the dyeing compositions of the present invention in the customary amounts; for example emulsifiers may be present in the dyeing compositions in concentrations from 0.5 to 30% by weight and thickeners in concentrations from 0.1 to 25% by weight of the total dyeing composition.

Further carriers for dyeing compositions are for example described in "Dermatology", edited by Ch. Culnan, H. Maibach, Verlag Marcel Dekker Inc., New York, Basle, 1986, Vol. 7, Ch. Zviak, The Science of Hair Care, chapter 7, p. 248-250, especially on p. 243, I. 1 to p. 244, I. 12.

If the oligomeric dyes according to the present invention are used together with oxidation dyes and/or the addition salts thereof with an acid, they may be stored separately or together. Preferably the oxidation dyes and the direct dyes which are not stable to reduction or base are stored separately.

The oligomeric dyes according to the present invention may be stored in a liquid to paste-like preparation (aqueous or non-aqueous) or in the form of a dry powder.

When the dyes are stored separately, the reactive components are intimately mixed with one another directly before use. In the case of dry storage, a defined amount of hot (from 50 to 80° C.) water is usually added and a homogeneous mixture prepared before use.

The dyeing compositions according to the invention may comprise any active ingredients, additives or adjuvants known for such preparations, like surfactants, solvents, bases, acids, perfumes, polymeric adjuvants, thickeners and light stabilizers.

The following adjuvants are preferably used in the hair dyeing compositions of the present invention:—non-ionic polymers—cationic polymers, acrylamide/dimethyldiallylammonium chloride copolymers, diethyl-sulfate-quaternized dimethylaminoethyl methacrylate/vinyl-pyrrolidone copolymers, vinylpyrrolidone/imidazolinium methochloride copolymers; quaternised polyvinyl alcohol, zwitterionic and amphoteric polymers, anionic polymers, thickeners, structuring agents, hair-conditioning compounds, protein hydrolysates, perfume oils, dimethyl isosorbitol and cyclodextrins, solubilizers, anti-dandruff active ingredients, substances for adjusting the pH value, panthenol, pantothenic acid, allantoin, pyrrolidonecarboxylic acids and salts thereof, plant extracts and vitamins, cholesterol; light stabilizers and UV absorbers, consistency regulators, fats and waxes, fatty alkanolamides, polyethylene glycols and polypropylene glycols having a molecular weight of from 150 to 50 000, complexing agents, swelling and penetration substances, opacifiers, pearlising agents, propellants, antioxidants, sugar-containing polymers, quaternary ammonium salts and bacteria inhibiting agents.

The dyeing compositions according to the present invention generally comprise at least one surfactant. Suitable surfactants are zwitterionic or ampholytic, or more preferably anionic, non-ionic and/or cationic surfactants.

A further embodiment of the present invention relates to the dyeing of keratin-containing fibers.

The processes comprises
(a) treating the keratin-containing fiber with at least one oligomeric dye according to the present invention and
(b) leaving the fiber to stand and then rinsing the fiber.

The oligomeric dyes according to the present invention are suitable for all-over dyeing of the hair, that is to say when dyeing the hair on a first occasion, and also for re-dyeing subsequently, or dyeing of locks or parts of the hair.

The oligomeric dyes according to the present invention are applied on the hair for example by massage with the hand, a comb, a brush, or a bottle, or a bottle, which is combined with a comb or a nozzle.

In the processes for dyeing according to the invention, whether or not dyeing is to be carried out in the presence of a further dye will depend upon the color shade to be obtained.

Further preferred is a process for dyeing keratin-containing fibers which comprises treating the keratin-containing fiber with at least one oligomeric dye according to the present invention, a base and an oxidizing agent.

A preferred embodiment for dyeing keratin-containing fibers, in particular human hair, with at least one oligomeric dye according to the present invention and an oxidizing agent, comprises
$a_1$) treating the keratin-containing fiber with the oxidizing agent, which optionally contains at least one oligomeric dye according to the present invention, $b_1$) treating the keratin-containing fiber with an oxidizing agent free composition, which optionally contains at least one oligomeric dye according to the present invention; or alternatively
$a_2$) treating the keratin-containing fiber with an oxidizing agent free composition, which optionally contains at least one oligomeric dye according to the present invention;
$b_2$) treating the keratin-containing fiber with an oxidizing agent, which optionally contains least one oligomeric dye according to the present invention,
with the proviso that at least in one of the process steps $a_1$), $a_2$), $b_1$) or $b_2$) at least one oligomeric dye according to the present invention is present.

In general, the oxidizing agent containing composition is left on the fiber for 0 to 45 minutes, in particular for 15 to 30 minutes at 15 to 45° C.

The oxidizing agent free composition usually comprises customary adjuvants and additives. Preferred are those, which are described in German Patent Application, in col 3, l. 17 to l. 41.

In general, the oligomeric dyes according to the present invention and the oxidizing agent free composition are left on the fiber for 5 to 45 minutes, in particular for 10 to 25 minutes at 15 to 50° C.

One preferred embodiment of the process is to wash the hair after dyeing with a shampoo and/or a weak acid, such as citric acid or tartrate acid.

The oligomeric dyes according to the present invention which are stable to reduction can be stored together with the oxidizing agent free compositions and may be applied as a single composition.

Advantageously the compositions comprising at least one oligomeric dye according to the present invention which are not stable to reduction are prepared with the oxidizing agent free composition just before the dyeing process.

In a further embodiment, the oligomeric dyes according to the present invention and the oxidizing agent free composition may be applied simultaneously or in succession.

Customary, the oxidizing agent containing composition is evenly applied in a sufficient amount related to the amount of hair, usually in amounts of 30 to 200 g.

Oxidizing agents are for example persulfate or dilute hydrogen peroxide solutions, hydrogen peroxide emulsions or hydrogen peroxide gels, alkali earth metal peroxides, organic peroxides, such as urea peroxides, melamine peroxides, or alkali metal bromate fixations are also applicable if a shading powder on the basis of semi-permanent, direct hair dyes is used.

Further preferred oxidizing agents are
oxidizing agents to achieve lightened coloration, as described in WO 97/20545, especially p. 9, l. 5 to 9,
oxidizing agents in the form of permanent-wave fixing solution, as described in DE-A-19 713 698, especially p. 4, l. 52 to 55, and l. 60 and 61 or EP-A-1062940, especially p. 6, l. 41 to 47 (and in the equivalent WO 99/40895).

Most preferred oxidizing agent is hydrogen peroxide, preferably used in a concentration from about 2 to 30%, more preferably about 3 to 20% by, and most preferably from 6 to 12% by weight the corresponding composition.

The oxidizing agents may be present in the dyeing compositions according to the invention preferably in an amount from 0.01% to 6%, especially from 0.01% to 3%, based on the total dyeing composition.

In general, the dyeing with an oxidative agent is carried out in the presence of a base, for example ammonia, alkali metal carbonates, earth metal (potassium or lithium) carbonates, alkanol amines, such as mono-, di- or triethanolamine, alkali metal (sodium) hydroxides, earth metal hydroxides or compounds of the formula

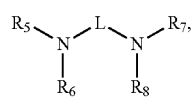

wherein

L is a propylene residue, which may be substituted with OH or $C_1$-$C_4$alkyl; and $R_5$, $R_6$, $R_7$ and $R_8$ independently or dependently from each other are hydrogen; $C_1$-$C_4$alkyl; or hydroxy-($C_1$-$C_4$)alkyl.

The pH-value of the oxidizing agent containing composition is usually about 2 to 7, and in particular about 2 to 5.

One preferred method of applying formulations-comprising the oligomeric dyes according to the present invention on the keratin-containing fiber, preferably the hair is by using a multi-compartment dyeing device or "kit" or any other multi-compartment packaging system, as described for example in WO 97/20545 on p. 4, l. 19 to l. 27.

Generally the hair is rinsed after treatment with the dyeing solution and/or permanent-wave solution.

A further preferred embodiment of the present invention relates to a method of dyeing hair with oxidative dyes, which comprises a. mixing at least one oligomeric dye according to the present invention and optionally at least one coupler compound and at least one developer compound, and an oxidizing agent, which optionally contains at least one further dye, and b. contacting the keratin-containing fibers with the mixture as prepared in step a.

For adjusting the pH-value organic or inorganic acids, as for example described in DE 199 59 479, col 3, l. 46 to l. 53 are suitable.

Furthermore, the present invention relates to a process of dyeing of keratin-containing fibers with at least one oligomeric dye according to the present invention and autooxidable compounds and optionally further dyes.

The process comprises a. mixing at least one autooxidable compound and at least one developer compound and at least one oligomeric dye according to the present invention and optionally further dyes, and b. treating the keratin-containing fiber with the mixture prepared in step a.

Furthermore, the present invention relates to a process for dyeing keratin-containing fibers with at least one oligomeric dye according to the present invention and capped diazotized compounds, which comprises, a. treating the keratin-containing fibers under alkaline conditions with at least one capped diazotized compound and a coupler compound, and optionally a developer compound ad optionally an oxidizing agent, and optionally in the presence of a further dye, and optionally with at least one oligomeric dye according to the present invention, and b. adjusting the pH in the range of 6 to 2 by treatment with an acid, optionally in the presence of a further dye, and optionally at least one oligomeric dye according to the present invention with the proviso that at least in one step a. or b. at least one oligomeric dye according to the present invention is present.

The capped diazotized compound and coupler compound and optionally the oxidizing agent and developer compound can be applied in any desired order successively or simultaneously.

Preferably, the capped diazotized compound and the coupler compound are applied simultaneously, in a single composition.

"Alkaline conditions" denotes a pH in the range from 8 to 10, preferably 9-10, especially 9.5-10, which are achieved by the addition of bases, for example sodium carbonate, ammonia or sodium hydroxide.

The bases may be added to the hair, to the dye precursors, the capped diazotized compound and/or the water-soluble coupling component, or to the dyeing compositions comprising the dye precursors.

Acids are for example tartaric acid or citric acid, a citric acid gel, a suitable buffer solution with optionally an acid dye.

The ratio of the amount of alkaline dyeing composition applied in the first stage to that of acid dyeing composition applied in the second stage is preferably about from 1:3 to 3:1, especially about 1:1.

The alkaline dyeing compositions of step a. and the acid dyeing compositions of step b. are left on the fiber for 5 to 60 minutes at 15 to 45° C., in particular for 5 to 45 minutes at 20 to 30° C.

Furthermore, the present invention relates to a process for dyeing keratin-containing fibers with at least one oligomeric dye according to the present invention and at least one acid dye.

The following examples serve to illustrate the processes for dyeing without limiting the processes thereto. Unless specified otherwise, parts and percentages relate to weight. The amounts of dye specified are relative to the material being dyed.

PREPARATION EXAMPLES

The oligomeric dyes described in this invention are prepared by reaction of the dye building blocks of formula (1) (WO 2004/7083312) or (2) (IP.com Journal (2004), 4(9), 31):

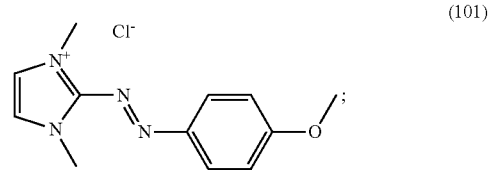

(101)

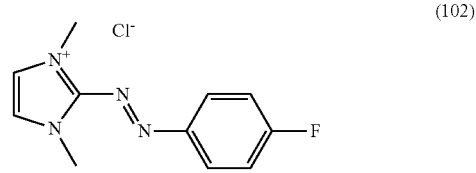

(102)

with oligomers given in Table 1 using the reaction conditions given in Table 2.

TABLE 1

| Oligomer No. | Specification |
|---|---|
| Oligomer 1 | Triethylenetetramine (AKZO NOBEL); CAS: 112-24-3; Assay (Tetramines) 97%; Light ends: 1%; Heavy ends: 2%; Water: 0.2% |
| Oligomer 2 | Tetraethylenepentamine (AKZO NOBEL); CAS: 112-57-2; Assay (Pentamines) 97%; Light ends: 3%; Water: 0.1%; |
| Oligomer 3 | Tetraethylenepentamine (Fluka); CAS: 112-57-2; 85% (GC); techn., Mixture with Pentaethylenepentamine |
| Oligomer 4 | Pentaethylenehexamine (AKZO NOBEL); CAS: 4067-16-7; Assay (basic Nitrogene) 31.4%; Water 0.2%; |
| Oligomer 5 | 1,4,8,11-Tetraazacyclotetradecan (96%, Fluka) |

The polymeric dyes are isolated using the following workup procedures:

Workup Procedure 1:

After cooling to room temperature and filtration, 2.5 eq. hydrochloric acid ares added to the reaction mixture.

The red suspension is stirred for 20 minutes and afterwards the red precipitate is collected by filtration.

The solid is washed with 2-propanol and dried over night in a vacuum oven at 50° C. to obtain the product as a red powder.

Workup Procedure 2:

The reaction mixture is cooled to room temperature and filtered.

The solvent is removed from the filtrate by evaporation.

The residue is suspended in 2-propanol and stirred for 1 day.

After filtration the red product is dried over night in a vacuum oven at 40° C.

TABLE 2

Reaction conditions for the examples A1-A5

| Ex. | Oligomer No. | Amount Oligomer | Dye No. | Amount Dye | Solvent | T [° C.] | Time | Workup Proc. | Yield [%] | Product Color |
|---|---|---|---|---|---|---|---|---|---|---|
| A1 | 1 | 1.37 g | (1) | 5 g | 200 ml 2-propanol | 60 | 22 h | 1 | 76 | red |
| A2 | 2 | 1.42 g | (1) | 5 g | 200 ml 2-propanol | 60 | 22 h | 1 | 81 | red |
| A3 | 3 | 0.14 g | (2) | 1 g | 9 ml methanol | 65 | 23 h | 2 | 28 | red |
| A4 | 4 | 1.45 g | (1) | 5 g | 200 ml 2-propanol | 60 | 22 h | 1 | 78 | red |
| A5 | 5 | 0.17 g | (2) | 1 g | 9 ml methanol | 65 | 22 h | 3 | 21 | red |

TABLE 3

Analytical data for examples A1-A5

| Example | $\lambda_{max}$ (nm) | 1H nmr (D$_2$O), δ (ppm) |
|---|---|---|
| A1 | 485 | 7.878 (d), 7.322 (s), 6.781 (d), 4.112-2.596 (m) |
| A2 | 490 | 7.909 (m), 7.730 (m), 7.552 (m), 7.343 (m), 6.964-6.440 (m), 4.182-2.506 (m) |
| A3 | 487 | 8.080-7.539 (m), 7.463-7.209 (m), 7.029-6.477 (m), 4.171-2.610 (m) |
| A4 | 495 | 8.205-7.543 (m), 7.378-7.212 (m), 6.924-6.396 (m), 4.077-2.656 (m) |
| A5 | 500 | LC-MS (ES+): m/z 797.5 (M+) |

Example A6

Step 1

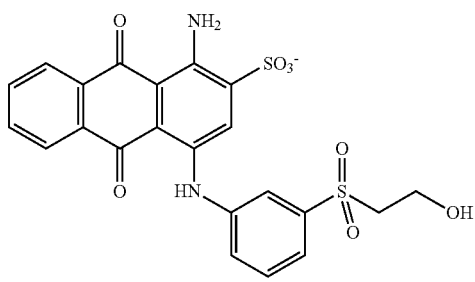

(103)

21.14 g of bromoaminic acid (50 mmol) are stirred with 180 ml water at room temperature over night.

11.89 g of 2-(3-aminophenylsulphonyl)ethanol-hydrochloride [19076-03-0] (50 mmol) and 1.19 g lithium hydroxide solubilised in 15 ml water (50 mmol) are added followed by 14 g of sodium hydrogencarbonate.

The reaction mixture is then heated to 60° C.

12 ml of a water solution of 1 g of copper (II) sulfate.5H$_2$O (4 mmol) and 5 g oglucose.1H$_2$O are added in 4 portions over 5 h at 60° C.

After the reaction 6.3 ml of 60% sulfuric acid are added producing a gas evolution.

When it stopped the reaction mixture is filtered at 60° C. and washed with 20 ml water, 200 ml methanol and again 500 ml water giving after drying under vacuum, 24.3 g (90%) of the coupling product of formula (103).

MS (ES+): m/z 503, 1H NMR (DMSO-d6): δ[ppm] 11.85 (s, 1H), 10.0 (s, 1H), 8.3 (t, 2H), 8.1 (s, 1H), 7.9 (m, 2H), 7.75 (s, 1H), 7.65 (m, 3H), 7.5 (s, 1H), 4.9 (t, 1H), 3.75 (m, 2H), 3.5 (t, 2H).

Step 2

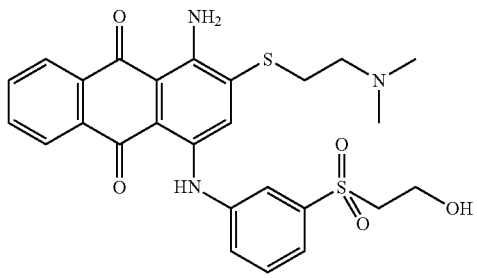

(104)

2.48 g of thiourea [62-56-6] (32.6 mmol) and 4.7 g of N-(2-Chloroethyl)-N,N-dimethyl-ammonium chloride [4584-46-7] (32.6 mmol) are stirred in 135 g water under reflux for 16 h. A 36% sodium hydroxyde solution was added until the reaction mixture reached a pH of 11. Then 10.48 g of the product of formula (103) (20 mmol) are added and the reaction mixture is stirred under reflux for an additional 8 h.

After cooling the reaction mixture is filtered and washed with 50 ml water/methanol(1/1), and 50 ml methanol.

After drying under vacuum, 8.54 g (81%) of the product of formula (104) are obtained.

MS (ES+): m/z 526. 1H NMR (DMSO-d6): δ[ppm] 12.2 (s, 1H), 8.5 (s, 2H), 8.25 (m, 2H), 7.85 (m, 3H), 7.55 (m, 3H), 7.4 (s, 1H) 4.9 (t, 1H), 3.75 (q, 2H), 3.55 (m, 2H), 3.2 (t, 2H), 2.6 m, 2H), 2.15 (s, 6H)

Step 3

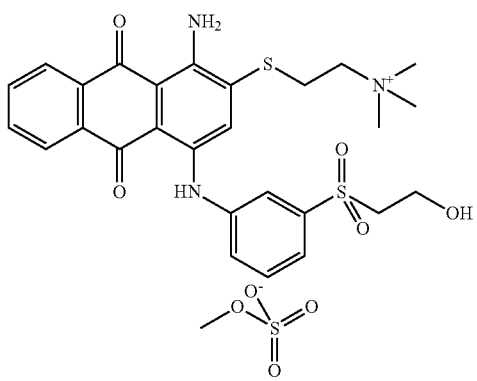

(105)

8.25 g of product of formula (104) (16.2 mmol) are suspended in 270 ml toluene and heated to 70° C.

1.69 ml dimethylsulfate [77-78-1] (17.8 mmol) are added dropwise over 3 h at 70° C. and stirred for 2.5 h at 73° C.

After cooling to room temperature, it is filtered off and washed with 200 ml isopropanol.

After drying under vacuum, 10.11 g (95%) of a dark blue powder of formula (105) are obtained.

MS (ES+): m/z 540. 1H NMR (DMSO-d6): δ[ppm] 11.9 (s, 1H), 8.5 (s, 2H), 8.3 (m, 2H), 7.9 (m, 3H), 7.75 (s, 1H), 7.65 (m, 3H), 4.9 (s, 1H), 3.75 (q, 2H), 3.5 (m, 6H), 3.4 (s, 3H), 3.05 (s, 9H)

Step 4

(106)

10.04 g of the product of formula (105) (15.4 mmol) were cooled in a ice bath. 38.7 g sulfuric acid 25% SO₃ fuming [8014-95-7] are added and the reaction mixture is stirred for 24 h at room temperature.

The reaction mixture is then added dropwise to a flask containing 187 g of ice and then stirred for 10 minutes.

The solid obtained was filtered and washed to give 8.6 g (90%) of the product of formula (106).

1H NMR (DMSO-d6): δ[ppm] 11.95 (s, 1H), 8.45 (s, 1H), 8.25 (m, 2H), 7.9 (m, 3H), 7.7 (m, 4H)

Example 7

A solution of 0.248 g of product of formula (106) (0.4 mmol) and 31 mg of pentaethylene-hexamine (Oligomer 4) in 4 ml methanol is stirred at 65° C. for 4 h. The reaction mixture is decanted and the solution evaporated to dryness giving 51 mg of blue oligomer.

1H NMR (D2O): δ[ppm] 8.0-6.4 (br, 9H), 3.5-2.2 (br, 69H)

B. Application Examples

Hair Samples

For the application examples the following hair types are used:
1 blonde hair tress (VIRGIN White Hair fro IMHAIR Ltd., via G. Verga 8, 90134 Palermo (Italy)),
1 middle blonde hair tress (UNA-Europ. nature hair, Color middle blonde from Fischbach & Miller, Postfach 1163, 88461 Laupheim, Germany),
1 bleached hair tress (UNA-Europ. nature hair, Color white bleached blonde from Fischbach & Miller, Postfach 1163, 88461 Laupheim, Germany).

Coloring Solution:

0.1% w/w of one of the dyes described in examples A1 to A4 are dissolved in a Plantaren solution (10% w/w Plantacare 200UP (ID: 185971.5)) in water; pH adjusted to 9.5 with 50% citric acid solution or monoethanolamine solution).

For some examples different solvents or solvent mixtures are used, which are given in Table 4.

Dyeing Procedure:

The hair tresses are dyed according to the following procedure:

The coloring solution is applied directly to the dry hair, incubated for 20 min. at room temperature, and then rinsed off under tap water (water temperature: 37° C.+/−1° C.; flow rate of water: 5-6 l/min.).

Then the tresses are pressed out with a paper towel and dried over night at room temperature on a glass plate.

Wash Fastness

For determination of the wash fastness two sets of hair tresses were dyed under the same conditions.

One set of the dyed tresses is washed with a commercial shampoo (GOLDWELL definition Color & Highlights, color-conditioner shampoo) using approx. 0.5 g shampoo for each tress under tap water (water temperature: 37° C.+/−1-1° C.; flow rate 5-6 l/min).

Finally the tresses are rinsed under tap water, pressed out with a paper towel, combed and dried with a hair dryer or at room temperature.

This procedure is repeated 10 times.

Then the color loss of the set of washed tresses relative to the set of unwashed tresses is evaluated using the Grey Scale according to: Industrial Organic Pigments by Herbst&Hunger, 2nd ed., p. 61, Nr 10: DIN 54 001-8-1982, "Herstellung and Bewertung der Änderung der Farbe", ISO 105-A02-1993.

TABLE 4

Results for Application Examples B1-B4

| Example | Dye | Solvent | Hair Type | Color | Intensity | Brilliance | Wash-fastness |
|---|---|---|---|---|---|---|---|
| B1 | A1 | Coloring Solution | blond | red | good | good | 4 |
|  |  |  | middle blond | red | good | good | 4-5 |
|  |  |  | bleached | red | good | good | 3 |
| B2 | A2 | Coloring Solution | blond | red | good | good | 4 |
|  |  |  | middle blond | red | good | good | 4-5 |
|  |  |  | bleached | red | good | good | 4 |
| B3 | A3 | Coloring Solution | blond | red | good | good | 4 |
|  |  |  | middle blond | red | good | good | 4 |
|  |  |  | bleached | red | good | good | 4 |
| B4 | A4 | Coloring Solution | blond | red | good | good | 4 |
|  |  |  | middle blond | red | good | good | 4-5 |
|  |  |  | bleached | red | good | good | 4 |
| B5 | A5 | Coloring Solution | blond | red | good | good | 2-3 |
|  |  |  | middle blond | red | good | good | 4-5 |
|  |  |  | bleached | red | good | good | 3 |
| B6 | A7 | Coloring Solution | blond | blue | moderate | moderate | 4 |
|  |  |  | middle blond | blue | moderate | moderate | 3-4 |
|  |  |  | bleached | blue | good | good | 3-4 |

The invention claimed is:

1. Cationic oligomeric dye, comprising a low molecular weight polyamine comprising the repeating units

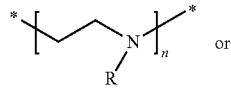

(1a)

or

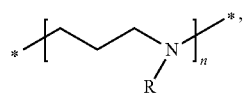

(1b)

wherein at least 90% of the polyamine molecules are selected from tetramines, pentamines and hexamines; and R is the residue of a cationic dye, which is covalently bonded, optionally via a linker, to the nitrogen atoms of the polyamine; or hydrogen; wherein the polyamine repeating units (1a) and (1b) comprise at least one carionic dye residue; and n is a number from 3-12.

2. Dye according to claim 1, wherein

R is hydrogen; or a radical of formula *—$X_1$—($Y_1^{a+}$), wherein $X_1$ is a linkage group selected from $C_1$-$C_{30}$alkylene, $C_2$-$C_{12}$alkenylene, $C_5$-$C_{10}$arylene, $C_5$-$C_{10}$cycloalkylene or $C_1$-$C_{10}$alkylene($C_5$-$C_{10}$arylene) which may be interrupted and/or terminated at one or both ends by one or more than one —O—, —S—, —N=, —N($R_1$)—, S(O)—, —$SO_2$—, —($CH_2CH_2$—O)$_{1-5}$—, —($CH_2CH_2CH_2$—O)$_{1-5}$—, —C(O)—, —C(O)O—, —OC(O)—,

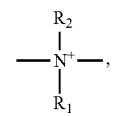

—CON($R_1$)—, —C(N$R_1R_2$)$_2$—, —($R_1$)NC(O)—, —C(S)$R_1$— or an optionally substituted, saturated or unsaturated, fused or non-fused aromatic or nonaromatic (hetero)cyclic bivalent radical optionally comprising at least one heteroatom; —O—; —S—; —N(R₁)—; —S(O)—; —SO₂—; —(CH₂CH₂—O)₁₋₅—; —C(O)—; —C(O)O—, —OC(O)—;

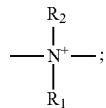

—C(O)N(R₁)—; S(O)₂N(R₁)—; —C(NR₁R₂)₂—; —(R₁)NC(O)—; —C(S)R₁—; saturated or unsaturated, fused or non-fused aromatic or nonaromatic bivalent radical optionally comprising at least one heteroatom, which is optionally substituted by $C_1$-$C_{30}$alkyl, $C_1$-$C_{30}$alkoxy, $C_2$-$C_{12}$alkenyl, $C_5$-$C_{10}$aryl, $C_5$-$C_{10}$cycloalkyl, $C_1$-$C_{10}$alkyl($C_5$-$C_{10}$arylene), halogen, hydroxy, E or E'; or the direct bond;

R₁ and R₂ independently from each other hydrogen; unsubstituted or substituted, straight-chain or branched, monocyclic or polycyclic, interrupted or uninterrupted $C_1$-$C_{14}$alkyl; $C_1$-$C_{14}$hydroxyalkyl; $C_1$-$C_{14}$aminoalkyl; $C_2$-$C_{14}$alkenyl; $C_6$-$C_{10}$aryl; $C_6$-$C_{10}$aryl-$C_1$-$C_{10}$alkyl; or $C_6$-$C_{10}$alkyl($C_6$-$C_{10}$aryl);

Y₁ is hydrogen; halogen; $C_1$-$C_6$alkyl; $C_1$-$C_6$-alkoxy; $C_1$-$C_6$alkylamino; $C_6$-$C_{10}$aryloxy; $C_6$-$C_{10}$arylamino; SO₂R₁; or a residue of an organic dye; wherein at least one of Y₁ and Y₂ is defined as a residue of an organic dye; and a is a number from 1 to 3.

3. Dye according to claim 1 which corresponds to the formula

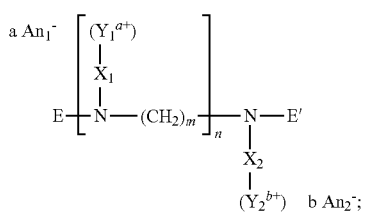

(2)

wherein

X₁ and X₂, independently from each other are a linkage group selected from $C_1$-$C_{30}$alkylene, $C_2$-$C_{12}$alkenylene, $C_5$-$C_{10}$arylene, $C_6$-$C_{10}$cycloalkylene or $C_1$-$C_{10}$alkylene ($C_6$-$C_{10}$arylene) which may be interrupted and/or terminated at one or both ends by one or more than one —O—, —S—, —N=, —N(R₁)—, S(O)—, —SO₂—, —(CH₂CH₂—O)₁₋₅—, —(CH₂CH₂CH₂—O)₁₋₅—, —C(O)—, —C(O)O—, —OC(O)—,

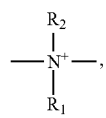

—CON(R₁)—, —C(NR₁R₂)₂—, —(R₁)NC(O)—, —C(S)R₁— or an optionally substituted, saturated or unsaturated, fused or non-fused aromatic or nonaromatic (hetero)cyclic bivalent radical optionally comprising at least one heteroatom; —O—; —S—; —N(R₁)—; —S(O)—; SO₂—; —(CH₂CH₂—O)₁₋₅—; —C(O)—; —C(O)O—, —OC(O)—;

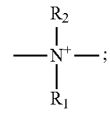

—C(O)N(R₁)—; S(O)₂N(R₁)—; —C(NR₁R₂)₂—; —(R₁)NC(O)—; —C(S)R₁—; saturated or unsaturated, fused or non-fused aromatic or nonaromatic bivalent radical optionally comprising at least one heteroatom, which is optionally substituted by $C_1$-$C_{30}$alkyl, $C_1$-$C_{30}$alkoxy, $C_2$-$C_{12}$alkenyl, $C_5$-$C_{10}$aryl, $C_5$-$C_{10}$cycloalkyl, $C_1$-$C_{10}$alkyl($C_6$-$C_{10}$arylene), halogen, hydroxy, E or E'; or the direct bond;

R₁ and R₂ independently from each other hydrogen; or unsubstituted or substituted, straight-chain or branched, monocyclic or polycyclic, interrupted or uninterrupted $C_1$-$C_{14}$alkyl; $C_1$-$C_{14}$ hydroxyalkyl; $C_1$-$C_{14}$ aminoalkyl; $C_2$-$C_{14}$alkenyl; $C_6$-$C_{10}$aryl; $C_6$-$C_{10}$aryl-$C_1$-$C_{10}$alkyl; or $C_6$-$C_{10}$alkyl($C_6$-$C_{10}$aryl);

Y₁ and Y₂ independently from each other are hydrogen; halogen; $C_1$-$C_6$alkyl; $C_1$-$C_6$-alkoxy; $C_1$-$C_6$alkylamino; $C_6$-$C_{10}$aryloxy; $C_6$-$C_{10}$arylamino; SO₂R₁; or a residue of an organic dye; wherein at least one of Y₁ and Y₂ is defined as a residue of an organic dye;

An₁ and An₂ independently from each other are an anion;

E and E' are hydrogen, $X_1Y_1^{a+}$, $X_2Y_2^{b+}$ or a nitrogen containing heterocyclic radical;

a and b independently from each other are a number from 1 to 3;

m is a number of 2 or 3; and n is a number from 3 to 6.

4. Dye according to claim 3, wherein

Y₁ and Y₂ independently from each other are halogen; hydrogen; $C_1$-$C_4$alkyl; or a radical selected from the group of anthraquinone, acridine, azo, azomethine, hydrazomethine, triphenylmethane, benzodifuranone, lactones, coumarine, diketopyrrolopyrrol, dioxazine, diphenylmethane, formazane, indigoid indophenol, naphthalimide, naphthoquinone, nitroaryl, merocyanine, methine oxazine, perinone, perylene, pyrenequinone, phtalocyanine, phenazine, quinoneimine, quinacridone, quinophtalone, styryl, stilbene, xanthene, thiazine and thioxanthene dyes.

5. Dye according to claim 3, wherein

Y₁ and Y₂ independently from each other are selected from azo, azomethine, hydrazomethine, anthraquinone, merocyanine, methine and styryl dyes.

6. Dye according to claim 1, wherein Y₁ and Y₂ are selected from the radical of formula (Y1)

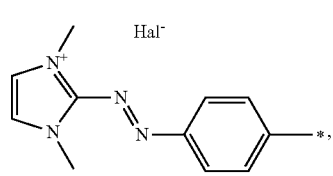

wherein

Hal is a halogen anion.

7. Dye according to claim 2, wherein in formula (2)

E and E' are hydrogen; $X_1Y_1^{a+}$; $X_2Y_2^{b+}$; or a radical of the formula

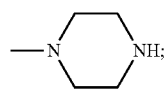

(2a)

n is a number from 3 to 6;

$X_1$ and $X_2$, independently from each other are a bivalent radical of formula (2b) $-(T)_t(Z)_z-$, wherein T is a radical selected from saturated or unsaturated, linear or branched $—C_1-C_{12}$alkylene-, $—C(O)—$, $—(CH_2CH_2—O)_{1-5}—$, $—(CH_2CH_2CH_2—O)_{1-5}—$, $—C(O)O—$, $—OC(O)—$, $—N(R_1)—$, $—CON(R_1)—$, $—(R_1)NC(O)—$, $—O—$, $—S—$, $—S(O)—$, $—S(O)_2—$, $—S(O)_2—N(R_1)—$, and $—N^+(R_1)(R_2)—$, which may be interrupted and/or terminated at one or both ends by one or more than one $—O—$, $—S—$, $—(SO_2)—$, $—N(R_5)—$, $—C(O)—$,

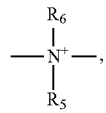

$—CON(R_5)—$, $—(R_5)NC(O)—$ and which is optionally substituted by $C_1-C_6$alkyl, $C_1-C_6$alkoxy, $C_6-C_{12}$aryl, halogen, hydroxy or $Y^+$; or is a direct bond;

Z is $—(CH_2)_2SO_2—$; $—CH_2CHRCO—NR_1—$; or a biradical of formula

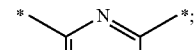

(1b)

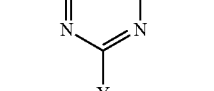

(1c)

; or

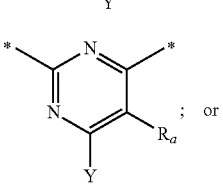

(1d)

$R_1$ and $R_2$ independently from each other are hydrogen; $C_1-C_6$alkyl; $C_1-C_6$alkoxy; $C_1-C_6$-alkylamino; $C_6-C_{10}$aryloxy; or $C_6-C_{10}$arylamino;

$R_a$ is hydrogen; $C_1-C_6$alkyl; $C_1-C_6$-alkoxy; $C_1-C_6$-alkylamino; $C_6-C_{10}$-aryloxy; $C_6-C_{10}$-arylamino; $SO_2R_1$; chlorine; or fluorine;

Y is $R_a$; E; or E';

a and b independently from each other are 1, 2 or 3; and t and z, independently from each other are 0; or 1.

8. Dye according to claim 7, wherein

T is $—C_2-C_3$alkylene-; $—C(O)—$; $—C(O)—CH_2—$; or $—(SO)_2—C_{2-6}$alkylene-;

Z is a a biradical of formula

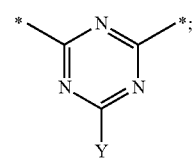

(1b)

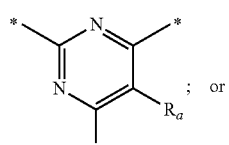

(1c)

; or

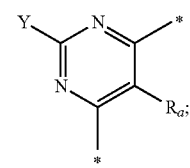

(1d)

Y is $R_a$; E; or E';

$R_1$ and $R_2$ independently from each other are hydrogen; $C_1-C_3$alkyl; $C_1-C_4$-alkoxy; $C_1-C_4$-alkylamino; $C_6$aryloxy; or $C_6$arylamino;

$R_a$ is chlorine, fluorine, methyl or $SO_2CH_3$; and

E and E' are hydrogen, $X_1Y_1^{a+}$, $X_2Y_2^{b+}$ or a radical of the formula

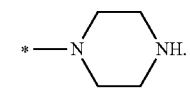

(2a)

9. Dye according to claim 7, wherein t and z are 0.

10. Cosmetic composition comprising at least one dye as defined in claim 1.

11. Composition according to claim 10 comprising in addition at least one single further direct dye and/or an oxidative agent.

12. Composition according to claim 10 in form of a shampoo, a conditioner, a gel or an emulsion.

13. A method of dyeing organic material, which comprises treating the organic material with at least one dye as defined in claim 1.

14. A method according to claim 13 which comprises treating the organic material with at least one dye and an oxidative agent and, optionally, a further direct dye.

15. A method according to claim 13, which comprises treating the organic material with at least one dye and at least one single oxidative dye, or treating the organic material with a dye and at least one single oxidative dye and an oxidative agent.

16. A method according to claim 13 wherein the organic material is selected from keratin-containing fibers.

17. A method according to claim 16 wherein the keratin-containing fiber is human hair.

18. A method of dyeing organic material, which comprises treating the organic material with the one composition according to claim 10.

* * * * *